United States Patent
Bordoni et al.

(10) Patent No.: US 11,047,252 B2
(45) Date of Patent: Jun. 29, 2021

(54) AIRCRAFT TURBINE ENGINE WITH PLANETARY OR EPICYCLIC GEAR TRAIN

(71) Applicant: Safran Aircraft Engines, Paris (FR)

(72) Inventors: Nils Bordoni, Moissy-Cramayel (FR); Guillaume Patrice Kubiak, Moissy-Cramayel (FR); Kevin Morgane Lemarchand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 112 days.

(21) Appl. No.: 15/560,464

(22) PCT Filed: Mar. 22, 2016

(86) PCT No.: PCT/FR2016/050630
§ 371 (c)(1),
(2) Date: Sep. 21, 2017

(87) PCT Pub. No.: WO2016/151236
PCT Pub. Date: Sep. 29, 2016

(65) Prior Publication Data
US 2018/0073384 A1    Mar. 15, 2018

(30) Foreign Application Priority Data
Mar. 26, 2015 (FR) ...................................... 1552573

(51) Int. Cl.
*F01D 15/12* (2006.01)
*F01D 19/00* (2006.01)
(Continued)

(52) U.S. Cl.
CPC ............. *F01D 15/12* (2013.01); *F01D 19/00* (2013.01); *F02C 7/275* (2013.01); *F02C 7/277* (2013.01);
(Continued)

(58) Field of Classification Search
CPC ........ F01D 19/00; F01D 15/12; F01D 21/006; F02C 7/275; F02C 7/277; F02C 7/36;
(Continued)

(56) References Cited

U.S. PATENT DOCUMENTS 3,907,386 A * 9/1975 Kasmarik ............. F01D 25/162
384/559
4,214,440 A * 7/1980 Rucker ..................... F02C 3/04
60/226.3
(Continued)

FOREIGN PATENT DOCUMENTS

FR     2 405 367 A1    5/1979
GB     2005 356 A      4/1979
(Continued)

OTHER PUBLICATIONS

International Search Report in PCT/FR2016/050630 dated Jun. 29, 2016.

*Primary Examiner* — Courtney D Heinle
*Assistant Examiner* — Elton K Wong
(74) *Attorney, Agent, or Firm* — Womble Bond Dickinson (US) LLP

(57) ABSTRACT

Aircraft turbine engine comprising a low-pressure spool that comprises a low-pressure shaft (24), means (44) for taking off power from said low-pressure shaft, and a fan (28) that is driven by said low-pressure shaft by means of a reduction gear (32), said reduction gear comprising at least one first element (50) that is connected to said low-pressure shaft for conjoint rotation, at least one second element (56) that is connected to said fan for conjoint rotation, and at least one third element (52) that is connected to a stator casing of the turbine engine, characterised in that said at least one third element is connected to said stator casing by disengageable connection means (60), and comprising at least one member that can move from a first position in which said at least one (Continued)

third element is fixedly connected to said stator casing into a second position in which said at least one third element is separated from said stator casing and is free to rotate about said longitudinal axis.

23 Claims, 4 Drawing Sheets

(51) Int. Cl.
   *F02K 3/06*      (2006.01)
   *F02C 7/36*      (2006.01)
   *F02C 7/275*     (2006.01)
   *F02C 7/277*     (2006.01)

(52) U.S. Cl.
   CPC .................. *F02C 7/36* (2013.01); *F02K 3/06* (2013.01); *F05D 2260/402* (2013.01); *F05D 2260/4023* (2013.01); *F05D 2260/40311* (2013.01); *F05D 2260/85* (2013.01); *Y02T 50/60* (2013.01)

(58) Field of Classification Search
   CPC .................. F02K 3/06; F05D 2260/402; F05D 2260/4023; F05D 2260/40311; F05D 2260/85
   See application file for complete search history.

(56) References Cited

U.S. PATENT DOCUMENTS

| | | | |
|---|---|---|---|
| 5,174,109 A | 12/1992 | Lampe | |
| 6,397,981 B1* | 6/2002 | Tamasho | B60T 13/741 188/156 |
| 2008/0098712 A1* | 5/2008 | Sheridan | F01D 15/10 60/226.1 |
| 2008/0098713 A1* | 5/2008 | Orlando | F02K 3/072 60/226.1 |
| 2009/0015011 A1* | 1/2009 | Colin | F01D 15/10 290/52 |
| 2012/0015776 A1* | 1/2012 | Lemmers, Jr. | F01D 21/006 475/271 |
| 2013/0164115 A1* | 6/2013 | Sennoun | F01D 25/12 415/1 |
| 2013/0202425 A1* | 8/2013 | Balk | F01D 9/041 415/200 |
| 2015/0071766 A1* | 3/2015 | Sha | F01D 11/22 415/126 |
| 2015/0345398 A1* | 12/2015 | McCune | F01D 25/164 417/374 |
| 2015/0361878 A1* | 12/2015 | Schwarz | F02C 3/04 60/774 |

FOREIGN PATENT DOCUMENTS

| | | |
|---|---|---|
| GB | 2 199 900 A | 7/1988 |
| JP | 2013 224589 A | 10/2013 |

* cited by examiner

AIRCRAFT TURBINE ENGINE WITH PLANETARY OR EPICYCLIC GEAR TRAIN

TECHNICAL FIELD

The present invention relates to an aircraft turbine engine comprising a planetary or epicyclic reduction gear.

PRIOR ART

An aircraft turbine engine typically comprises a low-pressure (LP) spool comprising a low-pressure (LP) shaft, and a high-pressure (HP) spool comprising a high-pressure (HP) shaft. The low-pressure and high-pressure shafts extend along the same longitudinal axis of the turbine engine.

The turbine engine further comprises a fan that is driven by the low-pressure shaft by means of a planetary or epicyclic reduction gear, as described in FR-A1-2 817 912.

The turbine engine provides the propulsive power but also the power required by all the systems of the aircraft. There is a tendency to increase said power that is removed from the turbine engine, inter alia in order to increase the comfort for the passengers of the aircraft.

This power is almost always removed from the HP spool. This is generally achieved by means of a radial mechanical shaft which meshes with the HP spool and transfers the power to a gearbox or accessory gearbox (generally referred to as an AGB), on which the equipment for converting said mechanical energy into a desired form (electrical, hydraulic, etc.), as well as the equipment required for the engine are located.

Offtake from the HP spool is advantageous. Indeed, there is little variation in the speed of the HP spool during a flight. Moreover, said offtake facilitates the dimensioning of the members driven by the AGB. Finally, said offtake makes it possible to use the take-off shaft in order to start the HP spool, by reversing the power transmission direction. Indeed, in order to start a turbine engine, it is desirable to drive the HP spool thereof directly, since lower inertia of the HP spool facilitates the start-up, and it is easier to ignite the combustion chamber of the turbine engine by driving the HP spool than the LP spool due to the high compression ratio of the HP compressor compared with the LP compressor. Finally, since the HP spool is the first to get up to speed upon start-up, connecting the AGB to the HP spool ensures that the lubrication members (oil pump, etc.) get up to speed before the other spools start up, making it possible to reduce wear and vibrations.

However, said mechanical offtake is disadvantageous for the operability of the HP compressor. Recent bypass turbine engines tend to have a relatively high bypass ratio (or BPR—the ratio of the rate of flow of the secondary flow or the cold flow to the rate of flow of the primary flow or hot flow), which reduces the flow rate of air passing through the HP spool. It has been found that a reduction in the mass airflow at the same compression ratio leads to the surge line being approached. Increasing the BPR therefore has a negative impact on the operability of the HP spool, which thus adds to the impact of the mechanical offtake. The same problem emerges when the overall pressure ratio (OPR) is increased, which is a trend that is also seen in recent turbine engines of which the thermal efficiency is to be increased.

Conventionally, air is removed from the HP compressor in order to meet the compressed air requirements of the aircraft, in particular for pressurisation of the cabin. Said offtakes increase the flow rate of air treated by the HP compressor, thus improving the operability thereof. Now, configurations without air offtake are sometimes studied in order to achieve an engine having a reduced fuel consumption, which reduces the air flow rate of the HP compressor and thus has a negative impact on the operability thereof. Moreover, in this latter type of configuration, the function of supplying the aircraft with compressed air can be undertaken by electrical equipment, which thus further increases the need for mechanical offtake from the turbine engine. The increase in the power required by the aircraft, the increase in the BPR leading to a reduction in the size of the spools, and the reduction in the air offtakes contribute to making it more and more difficult to achieve the current situation, in which the mechanical offtake occurs on the HP spool.

It has therefore been proposed, in particular in FR-A1-2 915 523, to take mechanical power from the LP spool rather than from the HP spool.

This configuration makes it possible to eliminate the problem of the operability of the HP spool, but produces another problem. Specifically, if the device for removing power now meshes with the LP shaft, it is no longer possible to start the turbine engine by driving the HP spool. It would be conceivable to provide two separate shafts, specifically a first shaft that meshes with the HP shaft in order to start the HP spool and the turbine engine, and a second shaft that meshes with the LP shaft in order to remove power once the turbine engine has been started. However, this solution would have a significant impact on the mass and the complexity of the turbine engine, which is reason to attempt to keep just one device for removing power that meshes with the LP shaft. This offtake generally occurs at the fast part of the LP, i.e. at the turbine shaft side.

In order to start a turbine engine from the LP spool thereof, it is necessary to drive said spool at a sufficiently high speed for the HP spool to in turn be driven by the air flow moved by the LP spool. It should therefore be anticipated that a high speed of the rotor of the LP spool is required. The inertia of the assembly is very high on account of the large-diameter fan and the multi-stage turbine having a large average radius. It therefore appears that very high energy and power are required for ensuring start-up, which is disadvantageous in particular on account of the dimensioning of the auxiliary power unit (APU) that is to be reviewed, and possibly that of the electric or pneumatic power circuit that is to be increased. Moreover, this would mean that the engine would have significant thrust upon start-up on account of the fan being driven, which could result in safety problems in the vicinity of the aircraft before takeoff.

The prior art comprises in particular FR-A1-2 405 367. Said document describes a single-spool turbine engine. A booster compressor is arranged upstream of the spool of the turbine engine, and a free turbine is arranged downstream of the spool, said free turbine driving a fan by means of a planetary transmission. A take-off shaft is driven by an output shaft that is fixed to an internal gear of the planetary transmission. This type of turbine engine has a low bypass ratio. The output shaft is locked during cruising flight, so as to immobilise the booster compressor and the internal gear of the planetary transmission. In other words, the internal gear of the reduction gear is able to rotate freely by default, and is blocked when the aircraft is in cruising flight. Furthermore, deflection is provided in order that the air bypasses the booster compressor and supplies the spool of the turbine engine.

GB-A-2 199 900 also describes a single-spool turbine engine. The spool of the turbine engine drives a propeller.

DISCLOSURE OF THE INVENTION

The present invention proposes a simple, effective and economical solution to this problem by virtue of an arrangement of the turbine engine comprising a reduction gear that makes it possible to start said engine more easily by driving the LP spool.

For this purpose, the invention proposes an aircraft turbine engine comprising a low-pressure spool that comprises a low-pressure shaft that connects a rotor of a low-pressure compressor to a rotor of a low-pressure turbine, and a high-pressure spool that comprises a high-pressure shaft that connects a rotor of a high-pressure compressor to a rotor of a high-pressure turbine, the low-pressure and high-pressure shafts extending along the same longitudinal axis, the turbine engine further comprising means for removing power from said low-pressure shaft, and a fan that is driven by said low-pressure shaft by means of a planetary or epicyclic reduction gear, said reduction gear comprising at least one first element that is connected to said low-pressure shaft for conjoint rotation, at least one second element that is connected to said fan for conjoint rotation, and at least one third element that is connected to a stator casing of the turbine engine, characterised in that said at least one third element is connected to said stator casing by disengageable connection device, and comprising at least one member that can move from a first position in which said at least one third element is fixedly connected to said stator casing into a second position in which said at least one third element is separated from said stator casing and is free to rotate about said longitudinal axis.

Thus, the fan can be decoupled from the LP spool, for example during start-up of the turbine engine. This makes it possible to prevent the disadvantages described above. Positioning the disengageable or decoupling means in the region of the connection between the stator casing and an element that is intended to be fixed when the turbine engine is in operation facilitates the implementation of said means.

During normal operation, after the step of starting up the turbine engine, the reduction gear is used as a planetary or epicyclic reduction gear having a fixed reduction ratio. When the engine is to be started, the proposed connection devices are disengaged, and the third element that is usually fixed is thus able to rotate freely. The operation of the reduction gear thus changes from operating mode to differential mode. The third element does not oppose any resistive torque apart from its own inertia, and almost all the torque from the low-pressure spool is transmitted to the third element. The fan is not driven and does not consume any mechanical energy. Said fan is decoupled from the low-pressure spool.

Start-up of the turbine engine is thus initiated by means of the LP spool. Start-up does not take place at the HP spool, which makes it possible to eliminate the radial shaft connected to the HP spool from the prior art (or rather to move said shaft in order for it to cooperate instead with the LP spool). Eliminating said shaft makes it possible to simplify the HP spool which does not comprise any mechanism for connection to the radial shaft, and to thus provide for a reduction in the size of said spool, in particular the radial dimension thereof. The HP spool does not need to be provided with an electric motor for start-up either, which motor tends to place excessive stress on the HP spool. The HP spool can thus be used solely for the supply for the combustion chamber, and for generating combustion gases. It is thus possible to have access to a twin-spool turbine engine, the HP spool of which is of a reduced size, which promotes optimisation of the bypass ratio of said engine.

The turbine engine according to the invention can comprise one or more than one of the following features, taken separately from one another or in combination with one another:
- the first element is a planetary shaft of the reduction gear,
- the second element is an external ring gear or a planet carrier of the reduction gear,
- said third element is an external ring gear of the reduction gear,
- said third element is a planet carrier of the reduction gear,
- said connection devices comprise an annular flange that is supported by said third element, said at least one member being movably mounted in at least one stirrup that is supported by said stator casing and is mounted on said flange,
- said at least one member, which is preferably a piston, is designed to come into abutment on said flange and to clamp said flange when said member is in the first position mentioned above,
- at least one of said at least stirrup and said at least one member comprises a support plate made of a material having a high friction coefficient,
- said at least one member is biased against the flange by at least one spring,
- said at least one member is designed to be moved in translation by means of a screw,
- said connection devices are connected to actuation means, for example hydraulic actuation means, that are connected to a computer of the turbine engine, and/or to pneumatic actuation means that are connected by supply means to air offtake means in a compressor of the high-pressure spool,
- the turbine engine has a bypass ratio of greater than 10, or even of greater than 12,
- the low-pressure and high-pressure rotors are not mechanically linked,
- the low-pressure compressor is designed to generate an airflow that passes through the high-pressure compressor in order to drive the rotor thereof,
- the high-pressure spool defines a duct which extends in the extension of a duct of the low-pressure spool. In other words, the HP spool is located in the same flow as the LP spool, which is not the case in the prior art document cited above.

The present invention also relates to a method for starting up or for operating an aircraft turbine engine as described above, characterised in that said method comprises a (start-up) step consisting in disengaging said connection device in order to move said movable member from the first position thereof into the second position thereof.

Optionally, the method then comprises a step consisting in engaging said connection device in order to move said movable member from the second position thereof into the first position thereof, and then a step of normal operation of the engine consisting in using the reduction gear as a planetary or epicyclic reduction gear having a fixed reduction ratio, the step of normal operation comprising phases of takeoff, climbing, cruising and descent. The method may comprise an accidental step of engine failure or standstill, requiring the fan to be set into autorotation and consisting in disengaging said connection device, or requiring the engine to be restarted and consisting in disengaging and then engaging said connection device.

DESCRIPTION OF THE FIGURES

The invention will be better understood and other details, features and advantages of the invention will become more clearly apparent on reading the following description, given by way of non-limiting example, and with reference to the accompanying drawings in which.

DETAILED DESCRIPTION

Figure 1:
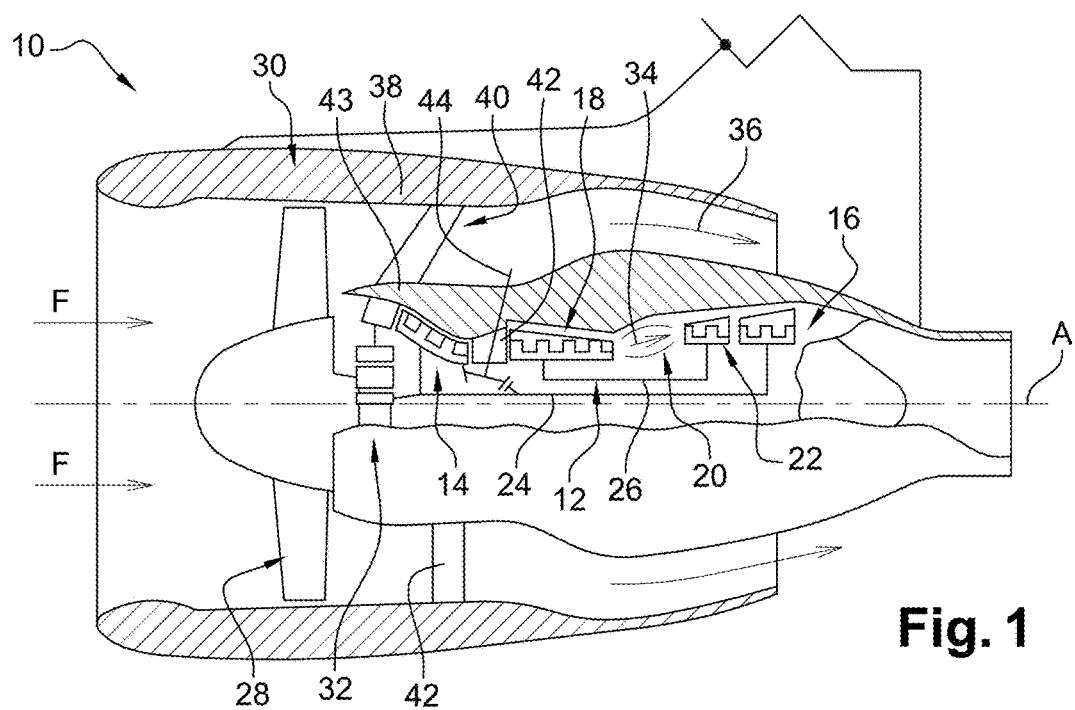
FIG. 1 is a schematic longitudinal section through a turbine engine comprising a reduction gear.
Figure 2:
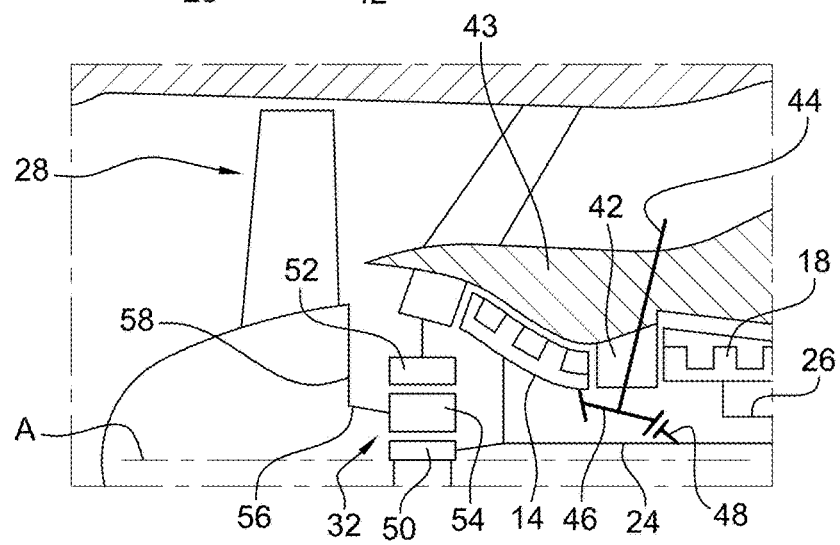
FIG. 2 is a larger-scale view of part of FIG. 1.

Reference is first made to FIGS. 1 and 2, which schematically show a double-spool bypass aircraft turbine engine 10.

The turbine engine 10 comprises, in a conventional manner, a gas generator 12, on either side of which a low-pressure compressor 14 and a low-pressure turbine 16 are arranged, said gas generator 12 comprising a high-pressure compressor 18, a combustion chamber 20 and a high-pressure turbine 22. In the following, the terms "upstream" and "downstream" are regarded in a main direction F of flow of the gases in the turbine engine, said direction F being in parallel with the longitudinal axis A of the turbine engine.

The rotors of the low-pressure compressor 14 and of the low-pressure turbine 16 form a low-pressure or LP spool and are interconnected by a low-pressure or LP shaft 24 that is centred on the axis A. Similarly, the rotors of the high-pressure compressor 18 and of the high-pressure turbine 22 form a high-pressure or HP spool and are interconnected by a high-pressure or HP shaft 26 that is centred on the axis A and arranged around the LP shaft 24. The low-pressure and high-pressure shafts extend along the longitudinal axis A and are not mechanically linked. The low-pressure compressor is designed to generate an airflow that passes through the high-pressure compressor in order to drive the rotor thereof. During start-up, the LP compressor provides a flow rate of air that is sufficient for aerodynamically driving the HP spool in a manner similar to the principle of the pneumatic starter motors of former aeroplane engines.

The turbine engine 10 further comprises a fan 28, in front of the gas generator 12 and the low-pressure compressor 14. Said fan 28 is rotatable about the axis A and is surrounded by a fan casing 30. Said fan is driven indirectly by the LP shaft 24 by means of a reduction gear 32 that is arranged between the LP spool and the fan 28, by being arranged axially between said fan and the LP compressor 14. The fan is thus decoupled from the LP spool in order to reduce the inertia of said spool. The fan provides only a very small amount of air to the primary flow, where the HP spool is located.

The presence of the reduction gear 32 for driving the fan 28 makes it possible to provide a greater fan diameter and thus promotes achievement of a higher bypass ratio, ensuring a saving in fuel consumption. Advantageously, the turbine engine has a bypass ratio of greater than 10, or even of greater than 12.

Furthermore, the turbine engine 10 defines a first channel 34 through which a primary flow is intended to pass, and a secondary channel 36 through which a secondary flow is intended to pass, which secondary flow is located radially towards the outside relative to the primary flow. Said secondary channel 36 is radially delimited towards the outside by a radially inner wall of a nacelle 30, said wall comprising an external collar 38 of an intermediate casing 40.

The intermediate casing 40 also comprises a hub that is connected to the external collar 38 by means of radial arms 42. The secondary channel 36 is delimited radially towards the inside by an outer wall of an inter-duct annular compartment 43 that comprises an inner wall 42 that surrounds in particular the LP 14 and HP 18 compressors. The arms 42 of the intermediate casing 40 extend radially towards the inside as far as the duct that connects the output of the LP compressor 14 to the input of the HP compressor 18.

A gearbox or an item of equipment (not shown) requiring mechanical power is provided in the turbine engine 10, said gearbox being referred to in the following as the AGB. Said gearbox is positioned, for example, inside the nacelle 30 of the turbine engine or in the inter-duct compartment 43.

A take-off shaft 44 (FIG. 2), which in this case passes through an arm 42 of the intermediate casing, is provided for taking off the mechanical power intended for supplying the AGB or the equipment.

In this case, the take-off shaft 44 extends substantially radially and comprises, at the radially inner end thereof, a toothed wheel 46 that meshes with a toothed wheel 48 that is connected to the LP shaft 24 for conjoint rotation. In this case, the wheels 46, 48 are conical and can be accommodated in a take-off housing, referred to as the IGB. The radially outer end of the shaft 44 can be connected to the AGB or to the equipment by means of an angle gearbox, referred to as the TGB, or also by means of a transmission shaft.

Figure 3:
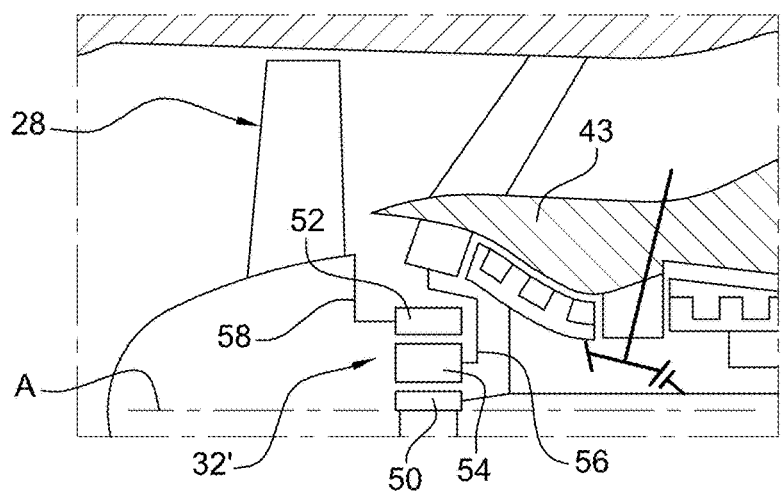
FIG. 3 is a view similar to that of FIG. 2 and depicts another reduction gear technology.

The reduction gear 32 of FIGS. 1 and 2 comprises an epicyclic gear train. It is noted that, conventionally, the gear train is referred to as epicyclic since the ring gear of the reduction gear is non-rotatable. When it is the planet carrier of said ring gear that is non-rotatable, as can be seen in FIG. 3, the reduction gear 32' is referred to as planetary.

Figure 4:
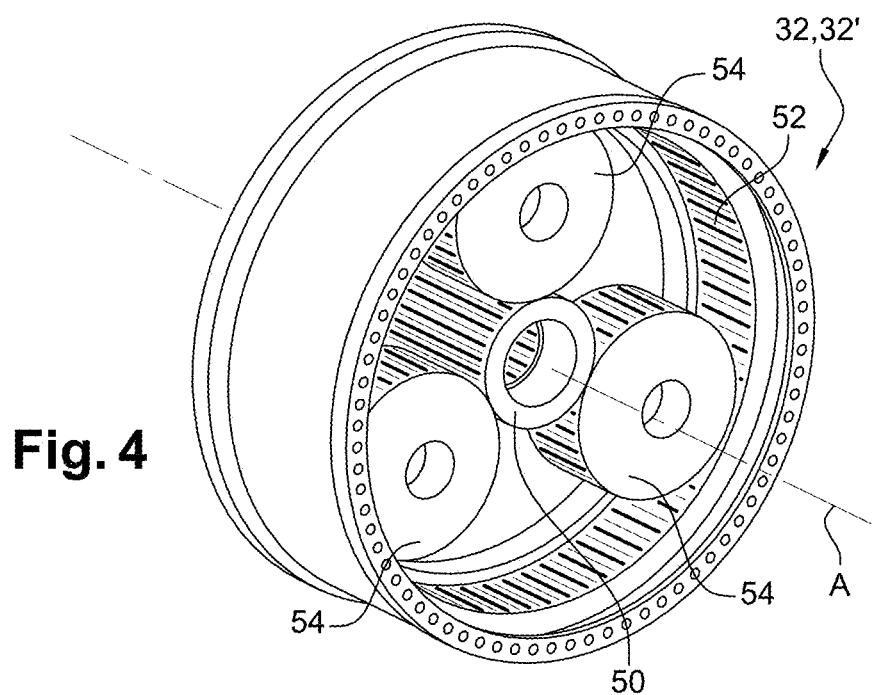
FIG. 4 is a schematic perspective view of a turbine engine reduction gear.

As can be seen more clearly in FIG. 4, a planetary 32' or epicyclic 32 reduction gear comprises a planetary shaft 50 that is centred on the axis A and is connected to the low-pressure shaft 24 for conjoint rotation, by being arranged in the upstream extension of said shaft 24.

The reduction gear 32, 32' further comprises an external ring gear 52 and planets 54 that mesh with the external ring gear 52 and the planetary shaft 50 and are supported by a planet carrier shaft 56.

In the epicyclic reduction gear 32 of FIGS. 1 and 2, the ring gear 52 is fixedly connected to an inter-duct compartment 43 stator casing, and the planet carrier 56 is connected to a fan shaft 58 for conjoint rotation, said fan shaft generally supporting the fan blades by means of a fan disc.

In the planetary reduction gear 32' of FIG. 3, the ring gear 52 is connected to the fan shaft 58 for conjoint rotation, and the planet carrier 56 is fixedly connected to the inter-duct compartment 43 stator casing.

Figure 5:
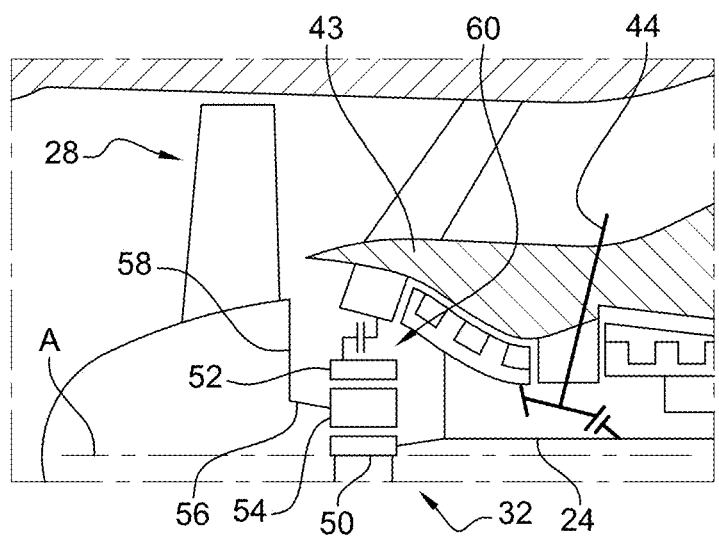
FIG. 5 is a view which corresponds to FIG. 2 and shows a first embodiment of the invention.
Figure 6:
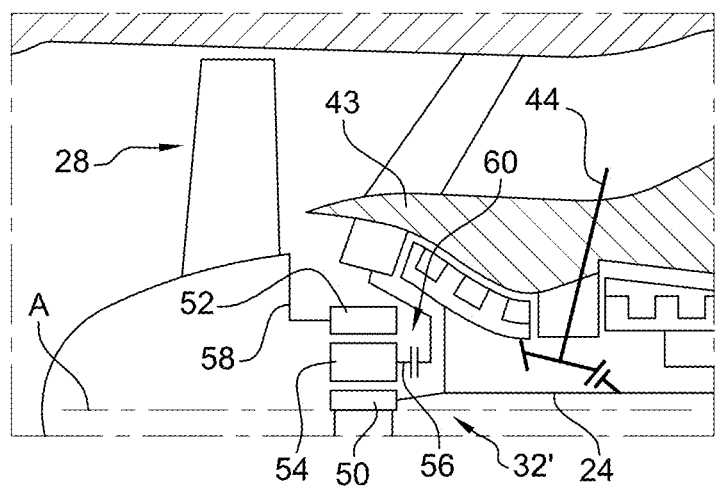
FIG. 6 is a view which corresponds to FIG. 3 and shows a second embodiment of the invention.

FIGS. 5 and 6 show embodiments of the present invention in which it is proposed to connect one of the elements of the reduction gear 32, 32' to the stator casing by means of disengageable connection device.

The embodiment in FIG. 5 relates to an epicyclic reduction gear 32 of the type of that of FIG. 2, i.e. of which the ring gear 52 is connected to the inter-duct compartment 43 stator casing. As in FIG. 2, the planetary shaft 50 of the reduction gear 32 is connected to the LP shaft 24 and the planets are supported by a planet carrier 56 that is connected to the fan rotor 58. The disengageable means for connecting the ring gear 52 to the stator casing are denoted by reference sign 60 and are shown schematically here. Specific embodiments are described in detail in the following, with reference to FIGS. 7 to 9.

The embodiment in FIG. 6 relates to a planetary reduction gear 32' of the type of that of FIG. 3, i.e. of which the planet carrier 56 is connected to the inter-duct compartment 43 stator casing. As in FIG. 3, the planetary shaft 50 of the reduction gear 32' is connected to the LP shaft 24 and the ring gear 52 is connected to the fan rotor 58. The disengageable means for connecting the planet carrier 56 to the stator casing are denoted by reference sign 60 and are shown schematically here.

Figure 7:
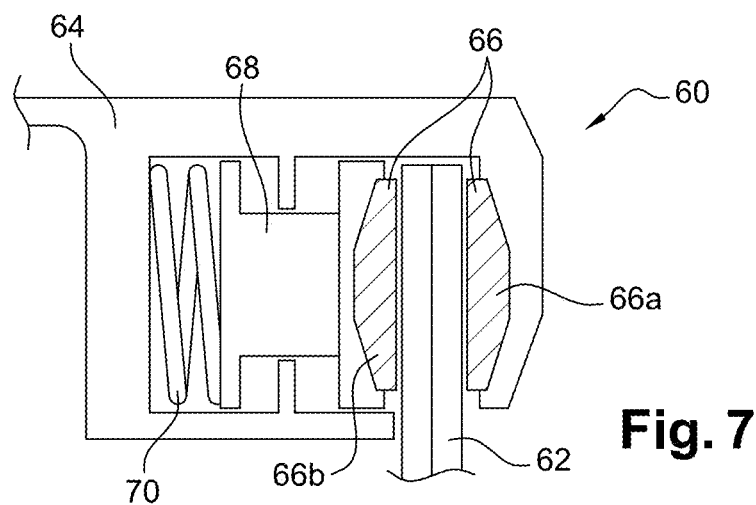
FIGS. 7 to 9 are schematic longitudinal sections through disengageable connection device for the turbine engine according to the invention.
Figure 8:
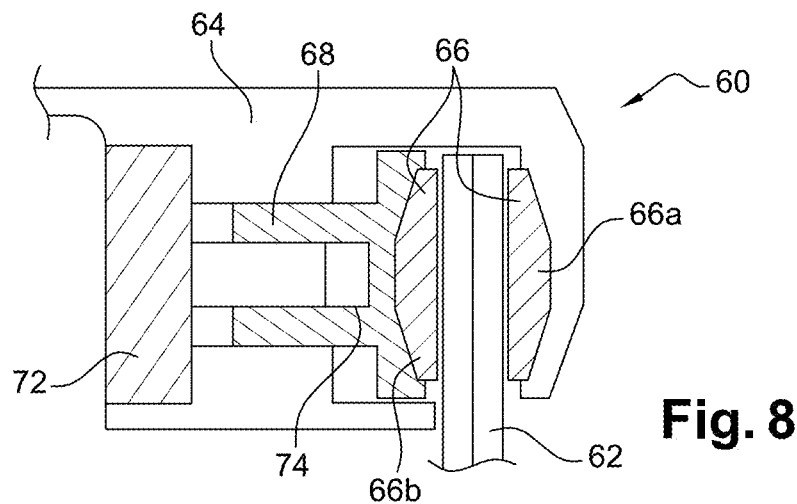
Figure 9:
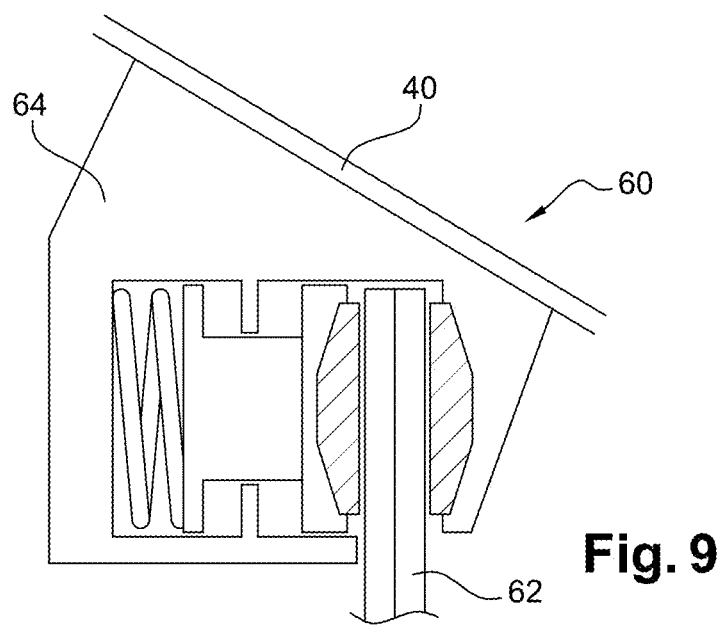

FIGS. 7 to 9 show embodiments of the disengageable connection device 60 according to the invention.

Reference is first made to FIG. 7, in which reference sign 62 denotes an annular flange that is rigidly connected to the element of the reduction gear to be connected to the inter-duct compartment 43 stator casing, i.e. the ring gear 52 of the reduction gear 32 or the planet carrier 56 of the reduction gear 32'.

Reference sign 64 denotes a stirrup that is comparable, in terms of operation, to a calliper of a disc brake of a motor vehicle. The flange 62 forms the disc. The stirrup is rigidly connected to the inter-duct compartment 43 of the stator casing.

The flange 62 is mounted in a recess of the stirrup 64. The stirrup 64 can be annular and can extend all around the flange. In a variant, said stirrup can be mounted in a region of the flange which can in turn be provided with a plurality of stirrups 64 of this type, for example so as to be regularly spaced about the axis A of the turbine engine. This depends, in particular, on the braking power requirement.

Plates 66, which are consumables, made of a material having a high coefficient of friction, are mounted in the recess of the stirrup 64, on either side of the flange 62. A first plate 66a is fixed in the stirrup 64 and is supported by a wall of the stirrup that extends substantially in parallel with the flange. A second plate 66b is movable in the recess of the stirrup and is supported by a movable member 68 such as a piston.

The member 68 comprises an elongate body, a longitudinal end of which is connected to a flat head that supports the second plate 66b. The member 68 is mounted in the stirrup so as to be slidable in translation from a first position, referred to as advanced, in which the head of the member is in abutment on the flange 62 and is clamped against the flange 62 by means of the second plate 66b, and a second position, referred to as retracted (shown in FIG. 7), in which the head of the member and the second plate 66b are spaced apart from the flange 62.

In the first position mentioned above, the member 68 rigidly connects the stirrup 64 to the flange 62, and thus the element of the reduction gear (ring gear 52 of the reduction gear 32 or the planet carrier 56 of the reduction gear 32') to the stator casing. The reduction gear 32, 32' thus operates in a conventional manner at a given reduction ratio. In the second position, the member 68 separates the stirrup 64 from the flange 62, and thus the element of the reduction gear (ring gear 52 of the reduction gear 32 or the planet carrier 56 of the reduction gear 32') from the stator casing. Said element is thus free to rotate, by being driven by the other elements of the reduction gear, which thus operate in differential mode. The reduction gear specifies an output torque ratio between the planet carrier and the ring gear. The torque split is specified by the geometry and in particular the radii of the parts. The speeds of the ring gear and of the planet carrier are linked to that of the planetary shaft by a relationship. These calculations are within the capability of a person skilled in the art.

The member 68 can be moved by control means comprising, for example, a computer and an actuator, for example a hydraulic actuator, or by any other actuation system. This solution provides maximum flexibility for using the decoupling.

The coupling could also be controlled pneumatically by the pressure at the output of the HP compressor, such that the coupling is implemented once the HP spool has slowed. Thus, once the HP spool has been ignited, the coupling would occur automatically due to the increase in pressure at the output of the HP compressor. At maximum speed, said pressure increases, and therefore the force available for implementing the coupling would also be greater, making it possible to withstand the increased torque without sliding or any other undesirable phenomenon. In the event of cut-off during flight, the fan would be automatically decoupled in order for it to be possible to restart the engine. In the embodiment in FIG. 7, this amounts to pressurising a fluid for moving the piston, using the pressure of the output air of the HP compressor, or direct actuation using pressurised air.

These two control principles could be combined so as to improve reliability and to manage failures. For example, in the event of the hydraulic pump failing, the pneumatic pressure could take over in order to maintain the pressurised coupling. In the embodiment in FIG. 7, this is no longer useful since a spring ensures coupling in the event of pressure loss.

Indeed, in the embodiment in FIG. 7, the member 68 is biased into the first position thereof by means of a compression spring 70 that is pretensioned between the stirrup and the member. This eliminates the need to maintain a constant hydraulic pressure during normal operation of the turbine engine, and thus permits higher reliability. The member 68 is thus pressurised only to disengage the member and move it into the second position thereof.

In the embodiment in FIG. 8, the member 68 is moved in translation between the first and second positions thereof by means of a screw 72, the threaded rod of which is screwed into a tapped bore 74 in the body of the member. The bore opens at the longitudinal end of the body opposite the head.

In the embodiment in FIG. 9, the system is similar to that of FIG. 7. In this case, the stirrup 64 thereof is fixed to the intermediate casing 40 in order to improve the dissipation of heat via the arms of the casing. The stirrup is pressed against a wall of the casing 40 so as to establish thermal conduction between the hot parts of the system and the casing 40 that is cooled by the air from the duct between the LP and HP compressors. This embodiment would be more advantageous if the stirrup were located closer to the duct. The external diameter of the flange 62 can thus be oversized in order to move the stirrup closer to the duct, which provides the flange with a flexibility that makes it possible to rigidly mount the stirrup.

The system in FIGS. 7, 8 and 9 could be isolated from the reduction gear 32, 32' lubrication enclosure in order not to be lubricated.

In the invention, the part that has been freed to rotate by the decoupling opposes very little resistive torque. The two forces to be overcome are the inertia during acceleration upon start-up, and the various frictions. However, the fan opposes a high resistive torque on account of the very high inertia thereof (mass at increased radius), the aerodynamic forces and the various frictions. Thus, when the starter motor is actuated in this decoupled configuration, the free element faces very little resistance and begins to rotate, little torque is absorbed at the input since there is little resistance from the free part and the input torque is low, the output torque applied to the fan in order for it to be mounted on the ring gear or the planet carrier remains low, this low torque being countered by the aerodynamic forces and the high inertia of the fan. As a result the fan does not rotate or barely rotates, the power absorbed by the fan is virtually zero, and the power absorbed by the free element at a stable speed results only from the friction and is therefore low.

It has therefore been possible to bring the LP spool to the required speed when starting up the HP spool without the fan absorbing power. Once the engine has been started, the part that has been left free is gradually braked until the rotation thereof stops. In so doing, the fan is caused to rotate as a reaction. The reduction gear 32, 32' then resumes its initial function as a speed reduction gear.

The invention therefore proposes a system that is simple to implement on account of stator/rotor coupling instead of rotor/rotor. Said invention also makes it possible to dissipate the heat, generated by the friction when re-coupling the fan, by means of the air from the duct located just above the reduction gear. For this purpose, said invention creates a system for conducting heat towards the arms of the input casing, and offtake of air from the duct of the LP compressor in order to provide cooling. Furthermore, the invention does not adversely affect the positioning of the centre of gravity, since said invention is integrated close to the reduction gear and to the support thereof on the engine casing and the engine suspension. Indeed, there is less of an overhang with respect to the wing of the aircraft. Finally, said invention allows auxiliaries associated with the invention to easily pass through the arms of the input casing just above the system.

In the event of the loss of a fan blade, the invention also allows the damaged fan to be decoupled so as to be able to use the turbine engine as a single-flow turbine engine, making it possible to achieve a residual thrust that may be significant for laterally rebalancing the thrust of the aircraft.

Figure 10:
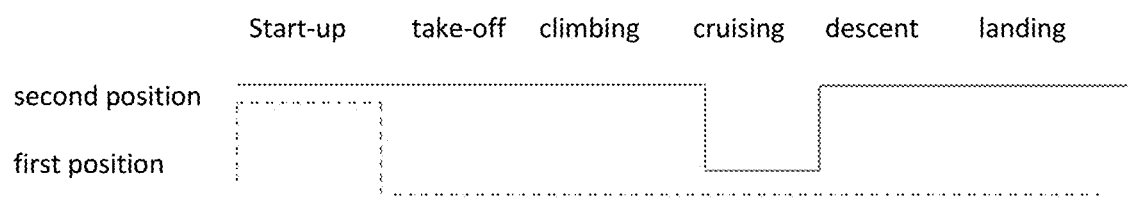
FIG. 10 is a diagram showing the steps of an operating method according to the invention (dashed line) compared with those of a conventional method (continuous line).

FIG. 10 shows, schematically and in a dashed line, an embodiment of the operating method according to the invention. It can be seen that the disengageable means are, by default, in the first position, apart from in the start-up step or phase where said means are in the second position thereof. By comparison, in the prior art as described in the prior application FR-A1-2 405 367, the disengageable means are, by default, in the second position, apart from in the cruising step or phase where said means are in the first position thereof.

The invention claimed is:

1. An aircraft turbine engine comprising
a low-pressure spool that comprises a low-pressure shaft that connects a rotor of a low-pressure compressor to a rotor of a low-pressure turbine, and
a high-pressure spool that comprises a high-pressure shaft that connects a rotor of a high-pressure compressor to a rotor of a high-pressure turbine, the low-pressure and high-pressure shafts extending along the same longitudinal axis (A), the turbine engine further comprising a device for removing power from said low-pressure shaft, and
a fan that is driven by said low-pressure shaft by means of
a planetary or epicyclic reduction gear, said reduction gear comprising at least one first element that is connected to said low-pressure shaft for conjoint rotation, at least one second element that is connected to said fan for conjoint rotation, and at least one third element that is connected to a stator casing of the turbine engine, wherein said at least one third element is connected to said stator casing by
a disengageable connection device, said disengageable connection device comprising at least one member that is movable from a first position in which said at least one third element is fixedly connected to said stator casing into a second position in which said at least one third element is separated from said stator casing to be rotatable about said longitudinal axis only when in said second position,
and wherein the first element is a planetary shaft which is centered on the longitudinal axis (A) and which is arranged in an upstream extension of the low pressure shaft, the planetary shaft being rotatable when said at least one third element is separated from said stator casing.

2. The aircraft turbine engine according to claim 1, wherein said third element is an external ring gear of the reduction gear.

3. The aircraft turbine engine according to claim 2, wherein the external ring gear is fixedly connected to the stator casing, the stator casing being a stator casing of an inter-duct compartment which separates a primary duct from a secondary duct.

4. The aircraft turbine engine according to claim 1, wherein said third element is a planet carrier of the reduction gear.

5. The aircraft turbine engine according to claim 4, wherein the planet carrier is fixedly connected to the stator casing, the stator casing being a stator casing of an inter-duct compartment which separates a primary duct from a secondary duct.

6. The aircraft turbine engine according to claim 1, wherein said connection device comprises an annular flange that is supported by said third element, said at least one member being movably mounted in at least one stirrup fixed to the stator casing and mounted on said flange.

7. The aircraft turbine engine according to claim 6, wherein said at least one member, which is a piston, is designed to come into abutment on the annular flange and to clamp said flange when said member is in the first position mentioned above.

8. The aircraft turbine engine according to claim 7, wherein at least one of said at least one stirrup and said at least one member comprises a support plate made of a material having a predetermined friction coefficient.

9. The aircraft turbine engine according to claim 8, wherein said at least one member is biased against the annular flange by at least one spring.

10. The aircraft turbine engine according to claim 8, wherein said at least one member is designed to be moved in translation by means of a screw.

11. The aircraft turbine engine according to claim 7 wherein said at least one member is biased against the annular flange by at least one spring.

12. The aircraft turbine engine according to claim 7, wherein said at least one member is designed to be moved in translation by means of a screw.

13. The aircraft turbine engine according to claim 6, wherein the stirrup is pressed against a wall of the stator casing.

14. The aircraft turbine engine according to claim 6, wherein the at least one stirrup is provided with a plurality of stirrups regularly spaced about the longitudinal axis.

15. The aircraft turbine engine according to claim 1, wherein said disengageable connection device is connected to a first actuator that is connected to a computer of the turbine engine.

16. The aircraft turbine engine according to claim 15, wherein the first actuator is a hydraulic actuator.

17. The aircraft turbine engine according to claim 1, wherein said turbine engine has a bypass ratio of greater than 10, or even of greater than 12.

18. A method for starting up an aircraft turbine engine according to claim 1, wherein said method comprises disengaging said disengageable connection device in order to move said movable member from the first position thereof into the second position thereof.

19. The aircraft turbine engine according to claim 1, wherein said fan is decoupled from the low-pressure spool when said third element is separated from said stator casing.

20. The aircraft turbine engine according to claim 1, wherein said device for removing power from said low-pressure shaft comprises a take-off shaft which extends through an arm of an intermediate casing.

21. The aircraft turbine engine according to claim 1, wherein said device for removing power from said low-pressure shaft comprises an inner radial end having a first toothed wheel that meshes with a second toothed wheel mounted on the low pressure shaft.

22. The aircraft turbine engine according to claim 1, wherein the stator casing is a stator casing of an inter-duct compartment which separates a primary duct from a secondary duct.

23. The aircraft turbine engine according to claim 1, wherein the reduction gear is arranged between the fan and the low pressure spool.

* * * * *